April 24, 1956  J. T. GELARDI  2,742,705
VERNIER LOCATION TAPE
Filed Oct. 28, 1954  2 Sheets-Sheet 1
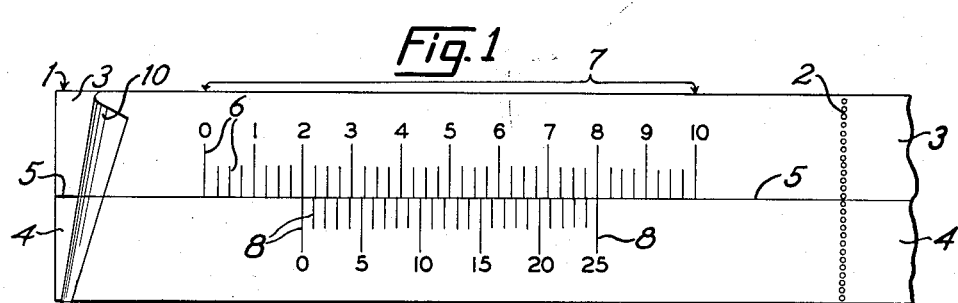
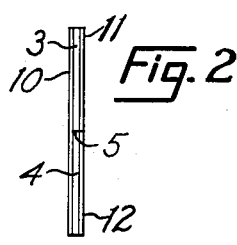 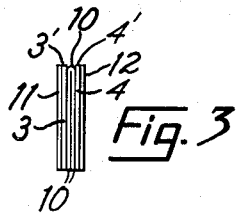 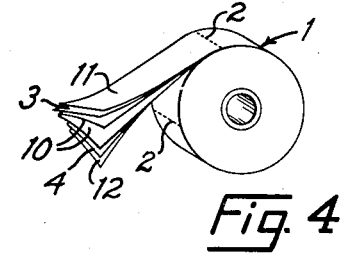
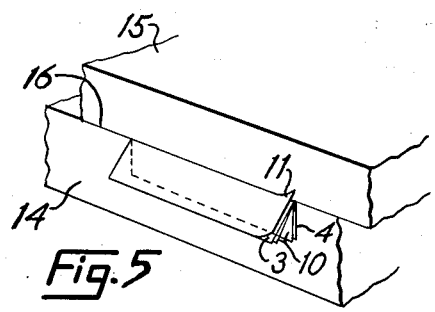 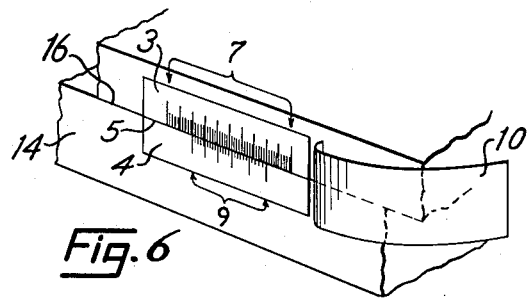
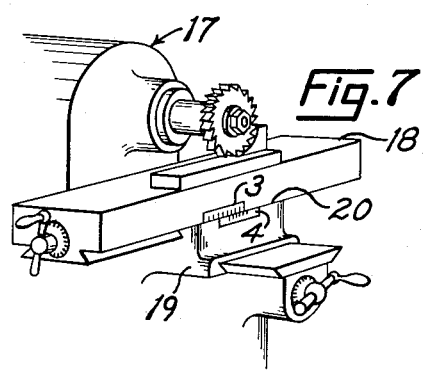 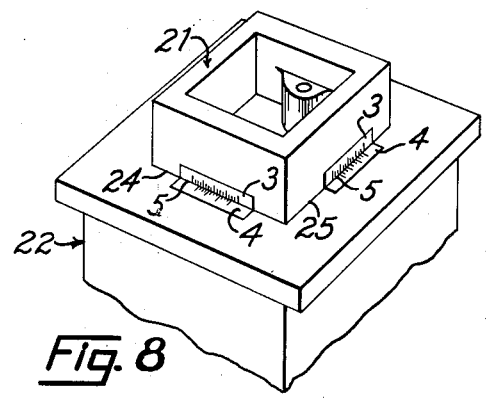
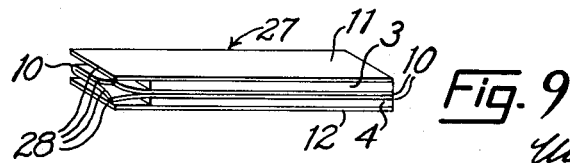
INVENTOR.
JOSEPH T. GELARDI
BY
ATTORNEY April 24, 1956     J. T. GELARDI     2,742,705
VERNIER LOCATION TAPE
Filed Oct. 28, 1954     2 Sheets-Sheet 2
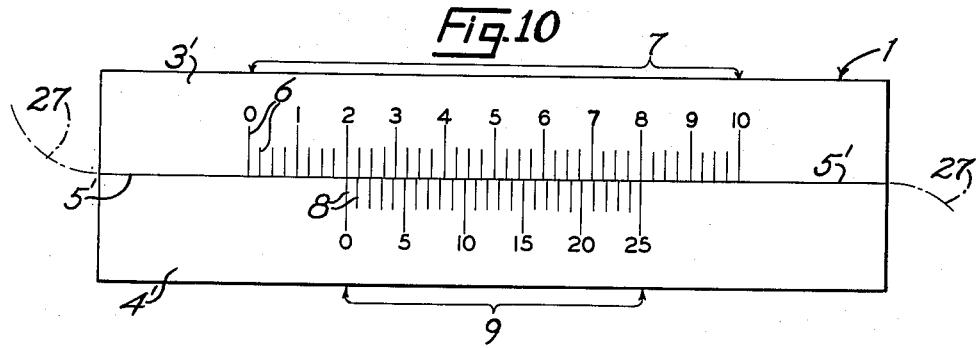
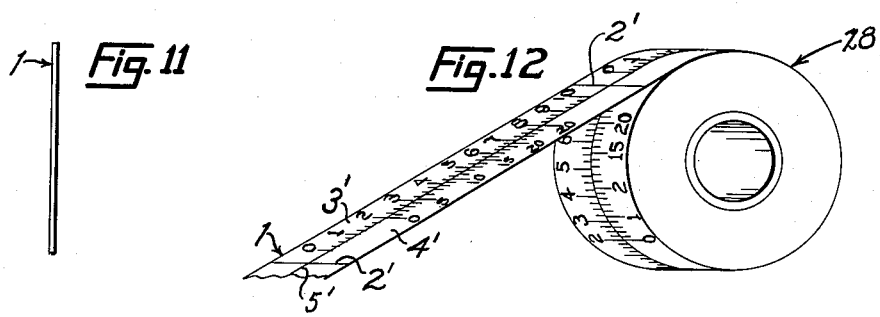
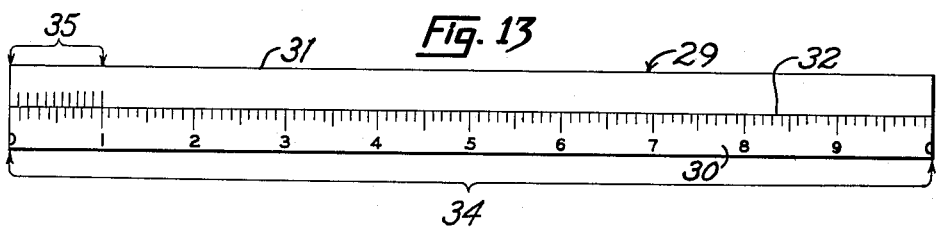
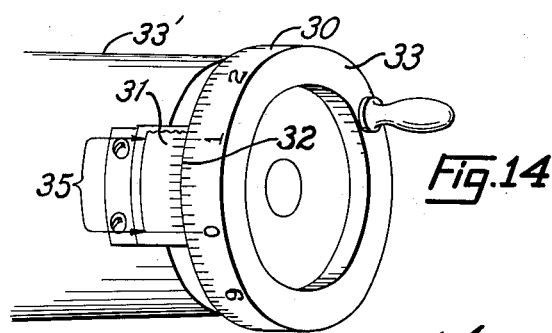
INVENTOR.
JOSEPH T. GELARDI
BY
ATTORNEY

United States Patent Office 2,742,705
Patented Apr. 24, 1956

2,742,705
VERNIER LOCATION TAPE

Joseph T. Gelardi, Yonkers, N. Y., assignor of one-half to Pellegrino A. Pisaniello, Bronx, N. Y.

Application October 28, 1954, Serial No. 465,404

16 Claims. (Cl. 33—137)

This invention relates to devices and methods for measuring the amount or extent of off-set, drift, or travel of one of two relatively movable surfaces, members or parts from a location, "zero," or reference point established between said two relatively movable surfaces, members, or parts, and/or for enabling said one member to be returned to said established location, "zero," or reference point. More particularly, this invention relates to the devices and methods aforesaid which are of utility especially in connection with machine tools.

It is among the objects of this invention to provide, for use with two relatively movable and mating, abutting, adjacent, or parallel surfaces, members, or parts, a means and method for establishing, as and when desired, a location, "zero," or reference point between said surfaces, members or parts and to enable accurate measurement to be made of the amount or extent of any off-set, drift, or travel of one of said two relatively movable surfaces, members, or parts from said established point, and/or to enable return to be made of said one member to precisely said established point and as often as may be desired, through the provision of a vernier location tape which, in use, will not restrict the capacity of such surfaces, members or parts for movement relative to each other.

It is another object of this invention to provide a simple, inexpensive, and accurate means and method to locate, or relocate, a location point between a machine tool and its movable table or parts, to the end that a "zero" position may be established at will on a machine tool in relation to the work being machined.

Other and further objects of this invention will appear from the following description, the accompanying drawing and the appended claims.

According to this invention, there is provided a flexible tape comprising side-by-side scale and vernier sections joined together separably along a separation or severance line extending therebetween lengthwise of the tape.

One such section is ruled on one of its faces to provide markings normal to the separation line which form a scale therealong hereinafter sometimes referred to as the scale. The scale may be of any form of measure such, for example, as inches, millimeters, degrees, etc. Each such scale section may be any number of inches, millimeters or other form of measure in length, as desired, and the tape comprises as many individual "units" as there are sections.

The opposite section of the tape unit likewise is ruled to provide markings normal to the separation line which form a vernier scale, sometimes hereinafter called the vernier, suitable to enable the making of proper vernier measurements in relation to the scale above mentioned.

The separation line is preferably located midway between the opposite edges of the tape with the scale and vernier markings each extending outwardly therefrom toward the respective opposite edges of the tape. In accordance with the invention, the tape unit, at the time of its application to two relatively movable surfaces or machine parts with which it is to be used, is placed so that the separation line will lie along the joint, line, or crevice forming a visible reference line separating the two surfaces or parts from each other. Thus, the separation line serves as a means for aligning a given tape unit with the joint line of the parts with which it is to be employed. It also serves as a guide line along which the connection between the scale and vernier sections is to be severed.

One face of the tape unit is preferably coated with a suitable adhesive, preferably a pressure-sensitive adhesive, so that after alignment of the unit as above mentioned, the scale section may be caused to adhere, securely but removably, to one of the two relatively movable parts, and the vernier section to the other. Then and only then is the connection between the two sections severed along the separation line. Thus, when the parts or surfaces to which the respective scale and vernier sections of a given unit are affixed move in relation to each other, the separated scale and vernier also move relatively an equal amount. The scale and vernier can then be read and the extent of movement and/or position noted. It follows that the initial or "zero" position of the parts can be restored again and again with a high degree of accuracy, and the same displacement or any other desired degree of displacement effected within the dimensional limits of the scale section.

The tape unit can be removed when desired by stripping the tape from the location surfaces. It may be manufactured as separate individual units, or in continuous roll form with perforations or serrations to allow each unit to be dispensed and separated therefrom, as desired.

In accordance with a preferred embodiment of this invention, the vernier and scale sections of each unit are in the form of separate and individual strips initially held together in edge-to-edge relationship by means of a cover strip adhesively removably bonded to the respective sections to cover them and hold them in their proper place in relation to each other. The sections of each such unit are preferably initially folded one upon the other along the separation line therebetween, the resultant fold line serving as a linear guide and separation line for aligning the separation line of the unit with the joint line between two relatively movable surfaces or parts. In such case, the folded unit is applied to the surfaces or parts by first affixing it by one of its adhesively backed sections to one of the parts and then completing the application by unfolding the other adhesively backed section of the unit into adhesive engagement with the other of the parts. The cover strip is then removed to sever the connection between the sections along the separation line to provide separate scale and vernier sections.

In accordance with another embodiment of this invention, the scale and vernier sections of each tape unit are initially integral but are adapted to be physically severed from each other along the separation line therebetween, the connection being cleanly severed by cutting along the separation line with a razor blade or other sharp cutting instrument, after the unit has been applied to the two relatively movable parts. Advantageously, the separation line may be established by a fine severance filament such, for example, as a fine string or wire, so placed in the tape between its opposite surfaces as to enable physical separation of the sections of each unit, one from the other, by pulling on one end of the cord and stripping the cord from the tape. The cord may be continuous with the tape from unit to unit with weakened portions between successive units if the units are in continuous strip form.

In general, the tape shall be flexible and may be manufactured of paper, cloth, plastic, metal or other thin, and preferably flexible, material or combination of materials suitable for the purpose. If desired, the tape may be designed as a decalcomania or transfer, thereby enabling the scale and vernier to be transferred directly onto the desired surface. The scale and vernier markings are printed or otherwise suitably marked onto or into the length of paper, plastic, cloth, or other material that will ensure that the tape units are durable, flexible and preferably relatively impervious to the action of different chemicals and abrasive materials with which the tape comes into contact in use. Preferably, a non-hardening adhesive is applied to the back of the tape so that the tape units may be stripped from the movable parts if desired. However a hardening adhesive may be employed if the tape units are to be attached permanently to the surface.

In certain instances, moreover, it may be advantageous to utilize the tape in accordance with this invention for establishing or creating scale and/or vernier markings on the relatively movable surfaces or parts, by forming the markings on the tape proper of a suitable etching or engraving material applied to that face of the tape, the back face, which is to be adhesively secured to the relatively movable surfaces. The etching or engraving material is preferably in paste form and, for example, may be a muriatic or other corrosive acid paste. Preferably, the paste markings are formed in or on the coating of adhesive on the back of the tape thereby to enable the adhesive coating to insulate the etching paste from the paper or other relatively non-acid resistant material of which the tape proper is fabricated. Advantageously, a protective backing strip or strips is applied to the back face of the tape over the paste-marked adhesive coating and serves to protect the relatively moist areas of etching paste markings against drying out and thus becoming relatively inactive pending use. It will be apparent that the backing strip will be stripped off when the tape is readied for use. Then, when the tape is applied to the relatively movable parts with its back face in adhesive engagement therewith, the etching paste will etch markings in the opposing surfaces, corresponding to the markings on the tape. After a suitable time interval, the tape may be stripped from the surfaces which now have a permanent and properly aligned scale and vernier thereon.

It will be understood that the foregoing general description and the following detailed description as well are exemplary and explanatory of the invention but are not restrictive thereof.

In the accompanying drawings which form part of the instant specification and are to be read in conjunction therewith, and in which like numbers refer to like parts throughout the several views:

Fig. 1 is a front view of a preferred embodiment of vernier locating tape in accordance with this invention, the view depicting a unit of a continuous multiple unit tape and illustrating the manner in which the connecting cover strip is peeled off;

Fig. 2 is a view of the tape unit of Fig. 1 in the unfolded state there shown and as viewed from the right hand end of the tape unit of Fig. 1;

Fig. 3 is an end view of the unit of Fig. 1 folded along the separation line between the vernier and scale sections of the unit;

Fig. 4 is a view of a roll of tape units such as are depicted in Fig. 1;

Fig. 5 is a view in perspective showing an initial step in the application of the tape unit of Fig. 1 to two relatively movable parts;

Fig. 6 is a view in perspective showing the cover-stripping step in a later stage of the application of the tape unit to the parts shown in Fig. 5;

Fig. 7 is a view in perspective showing the application of the tape unit to a milling machine, the vernier and scale sections of the unit having been separated along the separation line therebetween;

Fig. 8 is a view in perspective illustrating the application of the tape unit of this invention to two relatively movable structural elements whose location one to the other must be accurately maintained;

Fig. 9 is a somewhat enlarged view in perspective of an individual folded tape unit for packaging in boxes, the view showing in particular one form of tab arrangement for facilitating removal of the protective backing and cover strips of the unit;

Fig. 10 is a front view of another embodiment of tape unit in accordance with this invention;

Fig. 11 is an end view of the tape unit of Fig. 10;

Fig. 12 is a view in perspective of a roll of tape units corresponding to the unit of Fig. 11 but with the units in continuous strip form;

Fig. 13 is a front view of another embodiment of tape unit in accordance with this invention; and Fig. 14 is a fragmentary view in perspective of a machine tool to which the tape unit of Fig. 13 has been applied in accordance with this invention.

Referring now more particularly to Figs. 1 to 4 of the drawings, a number of identical vernier locating tape units 1 are joined together in end-to-end relationship in continuous strip form. Preferably, each such unit is connected to the succeeding unit along a weakened severance line 2 so as to facilitate the detachment of each unit from the strip as needed. Advantageously, each such strip of tape units may be spirally wound into a roll of tape units as shown in Fig. 4, for convenience in shipping and use.

Referring now more particularly to Figs. 1 to 4 of the drawings, there is depicted a length of tape material comprised of thin, flexible, separate strips 3 and 4 of paper, cloth or other suitable thin, flexible material, the strips having straight edge portions 3' and 4' respectively (Fig. 3), and being disposed in edge-to-edge relationship, as depicted in Fig. 1, so as to provide a linear separation line 5 therebetween. The strips 3 and 4 constitute scale and vernier sections, respectively, of the tape.

One face of the scale section 3, the front face as viewed in Fig. 1, is ruled to provide scale markings 6 thereon which are perpendicular to the separation line 5 and are spaced and arranged to form a scale 7 at and along the separation line. The corresponding face of the vernier section 4 is also ruled to provide suitable scale markings 8 forming a vernier 9 at and along the separation line 5. The scale 7 may be of any form of measure such, for example, as inches, millimeters, degrees, etc., and the vernier 9 is of the proper markings and measure to give the desired vernier readings when read with the scale 7.

The scale 7 as shown in Fig. 1 is divided into 40 equal parts and the vernier 9 is divided into 25 equal parts spanning 24 parts on the scale. Thus, each division of the scale may be read to one twenty-fifth on the vernier. It will be understood however that the scale and vernier may be marked in any practically useful system desired.

A cover strip 10 of thin, flexible and, preferably, transparent material such, for example, as a synthetic resin polymer material overlies the face of the tape and is removably adhesively bonded thereto, preferably by means of a pressure-sensitive adhesive on the back of the cover strip, so as to hold the scale and vernier sections together releasably along the separation line 5. This cover strip is co-extensive in length with the tape and is adapted to be peeled back, as indicated in Fig. 1, and removed at will so that the scale and vernier sections may be rendered free to move relative to each other along the separation line 5. The cover strip also serves to protect the scale markings 6 and 8 on the face of the tape pending its use.

In certain cases it may be desirable to fashion the scale and vernier sections of transparent material and to apply the scale and vernier markings to the back face of the tape so that the markings will be protected against defacement. In either case, however, the back of the tape is preferably adhesively coated, preferably with a pressure-sensitive adhesive, so that the tape may be made to adhere removably to the surfaces of the parts to which it is to be applied. If desired, however, both the adhesive coating and the markings may be applied to the front face of the tape so that when the tape is applied to the back of a transparent surface, the tape markings can still be read from the front of and through the surface to which the tape is applied. In such case, the cover strip would be applied to the back of the tape.

The tape comprises as many individual "units" 1 as there are scales. Advantageously, the tape may comprise a number of units 1 arranged in end-to-end relationship in continuous strip form as is indicated in Fig. 1. In such case each unit is connected to the succeeding unit preferably along a perforated, serrated, or otherwise weakened severance line 2, so as to facilitate detachment of each unit from the strip as needed. The cover strip 10 may be similarly fashioned for the same purpose.

Protective backing strips 11 and 12 of paper or other thin flexible material are applied to the adhesively coated back faces of the scale and vernier sections 3 and 4, respectively. These strips serve to prevent the adhesively coated back of the tape from adhering to surfaces with which it may come in contact prior to use. The assembly thus formed is adapted to be folded along the separation line 5 into the position shown in Fig. 3 so that the straight edge portions 3' and 4' of the folded tape may serve as a linear guide surface by which the tape may be initially oriented with reference to a linear point line between two relatively movable mating surfaces or parts of a machine tool or other apparatus with which the vernier location tape is to be used. When the tape thus folded comprises a large number of units 1 in continuous strip form, it may be spirally wound into a roll as in Fig. 4 from which the individual units may be detached as desired. This is made possible by reason of the removable backing strips 11 and 12 which serve to prevent one layer of tape in the roll from sticking to the next where the both contacting surfaces are coated with a pressure sensitive adhesive. If desired, a single backing strip may be employed to insulate the adhesively coated surfaces from each other in the roll form. The strips 11 and 12 may be of the same material as the cover strip 10 and/or the vernier and scale sections, or may be of a different material as desired. In a multiple unit tape, the strips are preferably provided with weakened severance lines at loci coinciding with the severance lines 2 of the tape units.

In using the vernier location tape of Figs. 1 to 3, the tape unit is first stripped of its vernier backing strip 12 so as to expose the adhesively coated back of the vernier section 4. Assuming that the tape is to be employed in conjunction with the device of Fig. 5 wherein a stationary part 14 slidably supports a movable part 15, the parts being movable relative to each other along a joint line 16, the vernier section 4 is oriented relative to the stationary part 14 so that the straight guide edge formed by the edge portion 3' and 4', Fig. 3, is accurately aligned with the joint line 16. Upon alignment, the vernier section 4 is pressed firmly into adherence with the stationary part 14. The scale backing strip 11 is then stripped off the scale section 3 which latter is then rotated on the hinge axis formed by the separation line 5, into adherence with the movable part 15, as in Fig. 6. It will be observed that in this position the parts 14 and 15 are locked together by the tape unit, and the separation line 5 and the joint line 16 coincide or substantially coincide. The cover strip 10 is now peeled off so as to unlock the parts 14 and 15, and thereby render the scale and vernier sections 3 and 4 movable relative to each other. Thus, as the parts 14 and 15 move along the line 16 in relation to each other, the scale 7 and vernier 9 will move an equal amount along the separation line 5. It follows that if the initial reading of the vernier relative to the scale be first noted, the amount or extent of any given movement of the part 14 along the line 15, whether to the right or left of the initial position, may be measured accurately within the limits of the scales chosen. Moreover the initial position of the parts 14 and 15 may be restored accurately again and again merely by reestablishing the initial reading of the scale and vernier.

In Fig. 7 there is illustrated the application of the vernier location tape of Fig. 1 to a milling machine 17 whose movable table 18 is reciprocably mounted on the bed 19 for linear movement in the plane of the joint line 20. As in the device of Figs. 5 and 6, the line 20 forms a reference line for orienting the vernier section 4 on the bed 19, or alternatively, the scale section 3 on the table 18, so that the separation line 5 will be aligned with the reference joint line 20.

Fig. 8 illustrates the application of the vernier location tape of Fig. 1 to accurately locating a removable fixture 21 in a desired reference position on a stationary mount 22. In this case, the problem is to enable the jig to be removed from the mount if necessary and to be returned to the exact position it occupied previously. To this end a first vernier locating tape unit 1 is applied as aforesaid to the mount 22 and fixture so that the separation line 5 of the tape unit is aligned with a first joint line 24 formed by the fixture with the mount in the desired position of the fixture on the mount. Similarly, a second tape unit 1 is applied to the mount and fixture so that the separation line 5 of the tape is aligned with a second joint line 25 formed by the fixture with the mount in the same position. After both units have thus been applied, the removable cover strip 10 of each unit is removed and the exact reading of each unit ascertained from the scale and vernier sections 3 and 4. Should it be necessary to remove the fixture for any reason it may be returned to the exact same position merely by reestablishing the precise readings of the vernier and scale sections of each unit.

In the embodiment of this invention as depicted in Fig 9, the vernier location tape is constituted by a single unit 27 conforming in all particulars to the folded tape unit 1 shown in Fig. 3 except that the cover strip 10 and the scale and vernier backing strips 11 and 12, respectively, are extended beyond one end of the scale and vernier sections 3 and 4, respectively, so as to form tabs 28 serving to facilitate manual stripping of these strips from the unit during the process of applying the unit. The single unit form of vernier locating tape lends itself to packaging in boxes for merchandising and storage since the backing strips 11 and 12 ensure against one unit adhering to another while packaged.

In the embodiment of this invention depicted in Figs. 10 and 11, scale and vernier sections 3' and 4', respectively, of the single tape unit shown are integral with each other instead of being separate but connected, as in the tape of Fig. 1. Separation line 5' instead of being a joint line between the scale and vernier sections, is in the form of a marking on the front face of the unit. In use, the separation line 5' is aligned with the joint line between two relatively movable parts, as has been explained above, and, after the scale and vernier sections have been adhesively bonded to the parts, the sections are severed physically from each other, preferably by cutting along the separation line with a razor or other suitable sharp instrument. If desired, the tape may be provided with a ripping cord suitably embedded in the unit along the separation line 5' and having projecting end portions 27 by which it may be pulled back along the tape after installation thereof so as to physically separate the sections 3' and 4' from each other along the separation line 5' as and when required.

The back face of the tape is adhesively coated, preferably with a pressure-sensitive adhesive, so as to enable the tape to be removably adhesively bonded to the parts with which it is to be employed. Advantageously, the tape may be manufactured in multi-units 1 in continuous strip form and spirally wound as into a roll 28, Fig. 12, wherein the respective units are successively connected to each other in initially integral and separable relation as along the weakened severance lines 2.

In the embodiment of this invention depicted in Figs. 13 and 14, a tape 29 having a scale section 30 and a vernier section 31 connected together in initially integral and separable relation along a separation line 32, is of a length adapting it just to fit the circumference of a machine tool hand wheel 33. The scale 34 and vernier 35 are so designed and located that the initial and final markings on the scale will combine to complement each other in the installed position on the wheel 33 and provide a common reference marking for the start and finish of the scale. As will be seen from Fig. 13, the initial marking on the scale 34 is one half of the zero marking employed, and the final marking is the other half of the same zero marking so that when the ends of the unit 29 are juxtaposed, the final marking will be complete and a full zero.

It will be understood that the back face of the tape 29 is adhesively coated so that the vernier and scale sections may be caused to adhere to the stationary part 33' of the device and to the wheel 33. Desirably, that portion of the vernier section 31 which is not occupied by the vernier 35 may be cut off after the scale and vernier sections have been separated along the separation line 32.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is therefore, to be understood that my invention is not to be limited to the specific details shown and described.

What is claimed is:

1. A vernier location tape for use with two members movable relative to each other along a visible reference line formed by one with the other, said tape comprising a length of tape material for application to said parts, said length having one of its faces coated with an adhesive and having scale and vernier sections lying, respectively, at opposite sides of a lengthwise-extending separation line along which said sections are adapted to be aligned with said visible reference line and separated one from the other, said sections having markings providing, as to one, a scale, and, as to the other, a vernier for use with said scale.

2. A vernier location tape for use with two members movable relative to each other along a visible reference line formed by one with the other, said tape comprising a length of tape material for application as a unit to said parts, said length having one of its faces coated with an adhesive, the other having scale and vernier sections lying, respectively, at opposite sides of a separation line extending lengthwise thereof along which said sections are adapted to be aligned with said visible reference line and separated one from the other, said sections having markings providing, as to the other, a vernier for use with said scale, the markings of each said section extending outwardly from said separation line.

3. A vernier location tape for use with two members movable relative to each other along a visible reference line formed by one with the other, said tape comprising a length of tape material for application as a unit to said parts, said length having one of its faces coated with a pressure-sensitive adhesive, the other having scale and vernier sections lying, respectively at opposite sides of a separation line extending linearly lengthwise thereof along which said sections are adapted to be aligned with said visible reference line and separated one from the other, said sections having markings providing, as to one, a scale, and as to the other, a vernier for use with said scale, the markings of each said section extending outwardly from and normal to said separation line.

4. A vernier location tape in accordance with claim 2 in which said length of tape material is a divided length providing along said separation line separate strips forming said scale and vernier sections, respectively, said strips being detachably connected to each other in edge-to-edge relationship along said separation line.

5. A vernier location tape in accordance with claim 2, in which said length of tape material comprises a number of units connected together in initially integral and severable relationship in continuous strip form along weakened severance lines, each said unit having a scale and a vernier section.

6. A vernier location tape in accordance with claim 2, in which said tape comprises a cover strip adhesively removably bonded to the scale and vernier face of said length of tape material, and in which said length of tape material is a divided length providing along said separation line separate strips forming said scale and vernier sections, respectively, said strips being detachably connected to each other in edge-to-edge relationship along said separation line by said cover strip.

7. A vernier location tape in accordance with claim 6, in which said tape comprises a protective backing strip removably adhesively bonded to the adhesively coated face of one of said separate strips.

8. A vernier location tape in accordance with claim 6, in which said tape comprises separate protective backing strips each removably adhesively bonded to the adhesively coated faces of the respective separate strips.

9. A vernier location tape in accordance with claim 7, in which said length of material is folded along said separation line.

10. A vernier location tape in accordance with claim 7, in which said cover strip and said protective backing strip extend beyond one end of said length of tape material to provide stripping tabs.

11. A vernier location tape in accordance with claim 6, said cover strip being transparent.

12. A vernier location tape in accordance with claim 2, in which said sections are integral with each other and in which said separation line is in the form of a marking on said length of tape material.

13. A vernier location tape in accordance with claim 2, in which said sections are integral with each other and in which said tape comprises a severance cord along said separation line for severing said sections from each other.

14. A vernier location tape for use with two members movable relative to each other along a visible reference line formed by one with the other, said tape comprising a length of tape material for application to said parts, said length having scale and vernier sections lying, respectively, at opposite sides of a lengthwise-extending separation line along which said sections are adapted to be aligned with said visible reference line, said sections having markings on corresponding faces thereof providing, as to one said section, a scale, and, as to the other, a vernier for use with said scale, said markings being comprised of an acid paste material for etching corresponding markings into said members when said tape is applied thereto.

15. A vernier location tape in accordance with claim 14, in which said sections are adhesively coated and said tape markings are insulated from the tape material by the adhesive.

16. A vernier location tape in accordance with claim 15, in which said markings are comprised of a moist acid paste material and in which a cover strip is removably applied to said length of tape material over said markings to preserve said paste material against drying out.

References Cited in the file of this patent

UNITED STATES PATENTS

| | | |
|---|---|---|
| 801,354 | Beckett | Oct. 10, 1905 |
| 2,187,087 | Leary | Jan. 16, 1940 |
| 2,190,582 | Wolf | Feb. 13, 1940 |
| 2,512,285 | Nippert | June 20, 1950 |
| 2,637,114 | McHugh | May 5, 1953 |

OTHER REFERENCES

Tracy (J. C.): "Plane Surveying," published by John Wiley & Sons, N. Y., first edition, 1913, pages 538 and 539 relied on. (Copy in Div. 66.)